US010316909B2

(12) United States Patent
Klingner et al.

(10) Patent No.: US 10,316,909 B2
(45) Date of Patent: Jun. 11, 2019

(54) DISC BRAKE, BRAKE CALIPER, AND BRAKE ROTARY LEVER

(71) Applicant: KNORR-BREMSE Systeme fuer Nutzfahrzeuge GmbH, Munich (DE)

(72) Inventors: Matthias Klingner, Moorenweis (DE); Ralf Weber, Munich (DE); Philipp Adamczyk, Stoettwang (DE); Christian Scheufler, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 68 days.

(21) Appl. No.: 15/436,355

(22) Filed: Feb. 17, 2017

(65) Prior Publication Data

US 2017/0159732 A1 Jun. 8, 2017

Related U.S. Application Data

(63) Continuation of application No. PCT/EP2015/066094, filed on Jul. 15, 2015.

(30) Foreign Application Priority Data

Aug. 20, 2014 (DE) ........................ 10 2014 111 864

(51) Int. Cl.
*F16D 55/08* (2006.01)
*F16D 65/00* (2006.01)
(Continued)

(52) U.S. Cl.
CPC ....... *F16D 65/0075* (2013.01); *F16D 55/226* (2013.01); *F16D 65/0068* (2013.01);
(Continued)

(58) Field of Classification Search
CPC ............. F16D 2125/66; F16D 2125/28; F16D 2125/32; F16D 55/33; F16D 2125/26
See application file for complete search history.

(56) References Cited

U.S. PATENT DOCUMENTS 5,501,305 A * 3/1996 Stalmeir ............. F16D 55/2245
188/153 R
5,582,273 A * 12/1996 Baumgartner .......... F16D 65/18
188/106 F
(Continued)

FOREIGN PATENT DOCUMENTS

CN 101802436 A 8/2010
CN 101809310 A 8/2010
(Continued)

OTHER PUBLICATIONS

Machine translation of WO 2014/041156 (no date).*
(Continued)

*Primary Examiner* — Nicholas J Lane
(74) *Attorney, Agent, or Firm* — Crowell & Moring LLP

(57) ABSTRACT

A disc brake, preferably a compressed air-actuated disc brake, in particular for a motor vehicle, has a brake application mechanism with a brake rotary lever, at least one spindle unit having a threaded rod screwed into a bridge, and a brake caliper. The caliper frames an edge region of a brake disc. The brake caliper has a brake application portion and a caliper back which are connected together via tie bars. The brake application mechanism with the brake rotary lever is received in the brake application portion of the brake caliper from an application face side of the brake disc. The brake application portion of the brake caliper has a first region, in which the application mechanism and a force transmission portion of the brake rotary lever are arranged, a second region, which is formed as a lever housing, and a lever portion for the brake rotary lever. A support wall with a bearing portion, which forms a pivot bearing with a brake rotary lever axis that runs parallel to the brake disc, for the brake rotary lever is arranged between the first region and the second region.

20 Claims, 11 Drawing Sheets

(51) Int. Cl.
*F16D 55/226* (2006.01)
*F16D 65/18* (2006.01)
*F16D 65/56* (2006.01)
*F16D 121/14* (2012.01)
*F16D 125/26* (2012.01)
*F16D 125/32* (2012.01)
*F16D 121/02* (2012.01)
*F16D 125/28* (2012.01)

(52) U.S. Cl.
CPC ............ *F16D 65/18* (2013.01); *F16D 65/183* (2013.01); *F16D 65/568* (2013.01); *F16D 2121/02* (2013.01); *F16D 2121/14* (2013.01); *F16D 2125/26* (2013.01); *F16D 2125/28* (2013.01); *F16D 2125/32* (2013.01)

(56) References Cited

U.S. PATENT DOCUMENTS

| | | | |
|---|---|---|---|
| 6,250,434 | B1 | 6/2001 | Baumgartner et al. |
| 6,923,297 | B1 * | 8/2005 | Thomas ................ F16D 65/00 188/196 D |
| 2002/0023807 | A1 | 2/2002 | Ortegren et al. |
| 2007/0209890 | A1 | 9/2007 | Irascko |
| 2010/0230219 | A1 | 9/2010 | Helf |
| 2010/0252370 | A1 | 10/2010 | Raffin et al. |
| 2011/0005871 | A1 | 1/2011 | Pericevic et al. |
| 2011/0209951 | A1 | 9/2011 | Baumgartner et al. |

FOREIGN PATENT DOCUMENTS

| | | |
|---|---|---|
| CN | 102112769 A | 6/2011 |
| DE | 197 29 024 C1 | 1/1999 |
| DE | 295 22 063 U1 | 7/1999 |
| DE | 198 55 614 C1 | 7/2000 |
| DE | 10 2004 037 771 A1 | 3/2006 |
| DE | 10 2007 001 960 A1 | 7/2008 |
| DE | 10 2007 024 787 A1 | 11/2008 |
| DE | 10 2012 003 104 A1 | 8/2013 |
| DE | 10 2012 108 670 A1 | 3/2014 |
| DE | 10 2012 108 682 A1 | 3/2014 |
| DE | 10 2012 108 689 A1 | 5/2014 |
| GB | 2 332 027 A | 6/1999 |
| JP | 2001-511504 A | 8/2001 |
| RU | 2 304 238 C1 | 8/2007 |
| RU | 2 514 604 C2 | 4/2014 |
| WO | WO 2014/041155 A1 | 3/2014 |
| WO | WO 2014/041156 A1 | 3/2014 |

OTHER PUBLICATIONS

International Preliminary Report on Patentability (PCT/IB/338 & PCT/IB/373) issued in PCT Application No. PCT/EP2015/066094 dated Mar. 2, 2017 including English translation of document C2 (German-language Written Opinion (PCT/ISA/237)) previously filed on Feb. 17, 2017 (Nine (9) pages).
English translation of Japanese Office Action issued in counterpart Japanese Application No. 2017-507005 dated Apr. 3, 2018 (eight pages).
German-language Office Action issued in counterpart German Application No. 10 2014 111 864.2 dated Feb. 27, 2015 (nine pages).
International Search Report (PCT/ISA/210) issued in PCT Application No. PCT/EP2015/066094 dated Sep. 17, 2015 with English translation (Four (4) pages).
German-language Written Opinion (PCT/ISA/237) issued in PCT Application No. PCT/EP2015/066094 dated Sep. 17, 2015 (Five (5) pages).
Russian-language Office Action issued in counterpart Russian Application No. 2017108807/11 dated Apr. 12, 2018 with unverified English translation (16 pages).
Chinese-language Office Action issued in counterpart Chinese Application No. 201580052253.6 dated May 30, 2018 with English translation (11 pages).

* cited by examiner

Fig. 1

DISC BRAKE, BRAKE CALIPER, AND BRAKE ROTARY LEVER

CROSS REFERENCE TO RELATED APPLICATIONS

This application is a continuation of PCT International Application No. PCT/EP2015/066094, filed Jul. 15, 2015, which claims priority under 35 U.S.C. § 119 from German Patent Application No. 10 2014 111 864.2, filed Aug. 20, 2014, the entire disclosures of which are herein expressly incorporated by reference.

BACKGROUND AND SUMMARY OF THE INVENTION

The invention concerns a disc brake, preferably a pneumatic disc brake, especially for a motor vehicle. The invention also concerns a brake caliper and a brake rotary lever.

In passenger cars and commercial vehicles, a disc brake is preferred. In the typical design of a disc brake, it consists of a brake caliper and internal mechanism, generally consisting of two brake pads and the brake disc. Forces are introduced to the internal mechanism, also called the brake application mechanism, via a force source, such as a pneumatically activated cylinder, by means of a piston rod. These forces are amplified by a cam mechanism and transferred as an application force via threaded tubes, also known as threaded pistons, threaded spindles, threaded rods, pressing dies, etc., by means of pressing pieces to the brake pads and brake disc. The wear on the brake disc and brake pads is balanced out by the threaded rods.

The application forces act across both brake pads on the brake disc, which experiences a slowdown in the rotational movement depending on the magnitude of the application force. The brake pad situated on the application face of the brake disc is called the application-side brake pad. The other brake pad is located on the other side of the brake disc, makes contact with a caliper back of the brake caliper, and is called the back-side brake pad. During a braking process, the application-side lining is moved toward the brake disc. Once this makes contact with the brake disc, the brake caliper is moved by the resulting counterforce with the back-side brake pad toward the brake disc. Now, if the back-side brake pad also makes contact with the brake disc, a braking action is generated.

Disc brakes are divided into axial brakes and radial brakes. These terms pertain to the introducing of the application force to a brake application mechanism in relation to the brake disc. Thus, with the axial brake, the application force is introduced axially to the brake disc, i.e., in the direction of the brake disc axis. With the radial brake, the application force is introduced to a brake application mechanism in the radial direction of the brake disc.

Conventional radial brakes have at least two housings or brake caliper components. This is seen as a drawback in regard to the number of parts and the required sealing surfaces.

In the course of weight reduction and costs in the automotive industry, especially in the commercial vehicle sector, there is a constant demand for cost- and weight-optimized disc brakes as far as possible with the same or even better performance and low number of parts.

Therefore, the problem which the present invention proposes to solve is to create an improved disc brake.

Another problem is to provide an improved brake caliper.

Yet another problem is to create an improved brake rotary lever.

The problem is solved by a disc brake with the features of the present invention.

The additional problem is solved by a brake caliper with the features of the present invention.

The further problem is solved by a brake rotary lever with the features of the present invention.

A disc brake is created in which the number of parts is less than in the prior art, while at the same time an improved force introduction into the structure of the brake caliper exists. Furthermore, a reduction of the sealing surfaces is made possible.

A disc brake according to the invention, preferably one actuated by compressed air (pneumatically), especially for a motor vehicle, includes a brake application mechanism with a brake rotary lever, at least one spindle unit, each spindle unit having a threaded rod that screws into a bridge, and a brake caliper, especially a sliding caliper, which preferably covers an edge region of a brake disc in the manner of a frame. The brake caliper has a brake application portion and a caliper back, which are connected together by tie bars. The brake application mechanism with the brake rotary lever is received on an application face of the brake disc in the brake application portion of the brake caliper. The brake application portion of the brake caliper has the following features: a first region in which the brake application mechanism and a force transmission portion of the brake rotary lever are arranged, a second region which is formed as a lever housing and receives a lever portion of the brake rotary lever, wherein between the first region and the second region there is arranged a support wall with a bearing portion, forming a pivot bearing with a brake rotary lever axis, that runs parallel to the brake disc, for the brake rotary lever.

Owing to this design of the brake caliper, it is possible to reduce the space required for the disc brake, so that a much greater clearance to an axle of an associated motor vehicle is made possible.

In one embodiment, two or more spindle units are provided, each of them having a threaded rod screwed into the bridge. This results in a large area of usage.

The construction of the brake application portion is such that the division into two regions results in an especially space-saving construction in terms of the height of the brake application portion of the brake caliper. Thus, the first region of the brake application portion has at least one bottom wall which runs substantially parallel with a portion of a top wall of the brake application portion.

Furthermore, this compact construction achieves a reduction of the sealing surfaces, since a one-piece embodiment of the brake caliper is possible.

The first region is separated at least partly from the second region by the support wall. Especially advantageously here, the support wall is arranged parallel to the brake disc and so as to be connected to the at least one bottom wall. It can therefore form the pivot bearing for the brake rotary lever, which can at the same time be easily installed by simple inserting through the first region, even though it requires a relatively long length. The inserting is made possible by the fact that a passageway between the first region and the second region of the brake application portion is provided between the bearing portion of the support wall and the inside of the top wall.

The second region of the brake application portion also has a bottom wall, which runs substantially parallel to a further portion of the top wall of the brake application portion. This results in the aforementioned space-saving design.

It is furthermore advantageous for the additional portion of the top wall of the brake application portion to have a flange, in the second region in the end region of the lever housing, with an opening for the attachment of a power drive for the disc brake. In this way, no additional component is needed for the attachment of a force generating element, such as a compressed air cylinder. The flange can be produced by machining, for example, and can also be adapted to different dimensions for its mounting or installation.

In another embodiment, it is provided that the bottom wall of the lever housing has, on its inside, an end stop portion with an end stop surface projecting toward the interior of the lever housing. The end stop surface is arranged beneath the opening of the flange. This end stop surface interacts with an end stop surface of the brake rotary lever, especially with its lever portion received in the lever housing as a stroke-limiting element. By appropriate machining of these two interacting end stop surfaces, a brake caliper can be used for at least two different brakes.

Furthermore, it is provided that the second region of the brake application portion of the brake caliper has a rear wall, which is arranged parallel to the support wall. In this way, on the one hand installation space is saved and, on the other hand, a stable lever housing is formed.

The bottom walls arranged parallel with the top wall as well as the support wall and rear wall arranged parallel to each other and perpendicular to the former allow the brake caliper to be formed as a casting with only one core or with two mirror-image cores.

In an especially advantageous manner, the support wall is connected to a slanted support wall, the slanted support wall extending away from the brake disc at an inclination in the direction of a brake disc axis and being connected to the bottom wall of the second region. With side walls, a so-called outer pocket is formed, by way of which a weight and casting optimization can be achieved.

A further advantage is created if the slanted support wall forms an angle with the bottom wall whose value is not equal to 0°. The angle can have a value, for example, in the range of 15° to 45°, preferably 30°. This makes possible an effective force introduction to the brake caliper during braking processes.

A further advantageously stable and weight-optimized embodiment is achieved in that a cross section of the lever housing tapers in the longitudinal direction toward the brake disc starting at the connection of the slanted support wall to the bottom wall and as far as the support wall or the passageway.

For a compact construction with the same or better performance at the same time, as well as easy installation, it is provided that the brake rotary lever has a curved, slender shape in its longitudinal direction with a lever body having side portions, a longitudinal stiffening, and at least one thrust bearing portion.

An especially stable and compact embodiment is achieved in that the lever body of the brake rotary lever has a lever portion and a force transmission portion, which are connected at the bottom side of the lever body to the longitudinal stiffening.

In another embodiment, the lever portion has a driving end, which at a top side a driving portion for interaction with a piston rod of a force generating element is defined, and the driving end having an end stop surface at the bottom side, which bottom side lies opposite the driving portion. The machining of the end stop surface has already been pointed out above, including the benefits in interaction with the end stop surface on the bottom wall of the lever housing.

Furthermore, it is provided that the force transmission portion of the lever body has a roughly semicircular middle web, on either side of which is arranged a semicircular thrust bearing portion with a respective thrust bearing surface. The middle web protrudes from the thrust bearing portions. In this way, relative movements of the brake rotary lever can be advantageously reduced if the middle web protruding from the thrust bearing portions is received in a guide of the bridge, thus forming a form-fitted lever guidance of the brake rotary lever in the direction of the brake rotary lever axis.

In yet another embodiment, on the side opposite the thrust bearing surfaces of the thrust bearing portions there is formed a bearing seat with a roughly semicircular cross section. The bearing seat has a center line which is identical to the brake rotary lever axis. With this bearing arrangement, a stable hysteresis can be made possible over the entire service life.

For a required eccentricity of the force transmission portion of the brake rotary lever, the center line of the bearing seat is arranged off center from a midpoint of the radii of the semicircular thrust bearing surfaces of the thrust bearing portions.

Furthermore, it is provided that a radius of the bearing seat is smaller than a radius of the thrust bearing surfaces of the thrust bearing portions, for example around 0.6 to 0.4 times smaller. This yields the advantage that, together with the curved, most slender possible shape of the brake rotary lever, an easy installation of the brake rotary lever is made possible.

It is especially advantageous to design the brake caliper as a single piece. Among other things, this reduces the sealing surfaces and the number of parts. It is also advantageous if at least the brake application portion of the caliper containing the brake application mechanism, including the rotary lever, is in one-piece.

In one embodiment, the disc brake can have an adjustment device.

The disc brake is designed as a radial brake.

A brake caliper according to the invention is provided for the above-described disc brake.

A brake rotary lever according to the invention is provided for the above-described disc brake.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic top view of an exemplary embodiment of a disc brake according to the invention.

Coordinates x, y, z in the figures serve to help with orientation.

The reference sign ZS indicates an application face of the disc brake 1, and reference sign RS indicates a back (reaction-side) face of the disc brake 1.

DETAILED DESCRIPTION OF THE DRAWINGS

Figure 1:
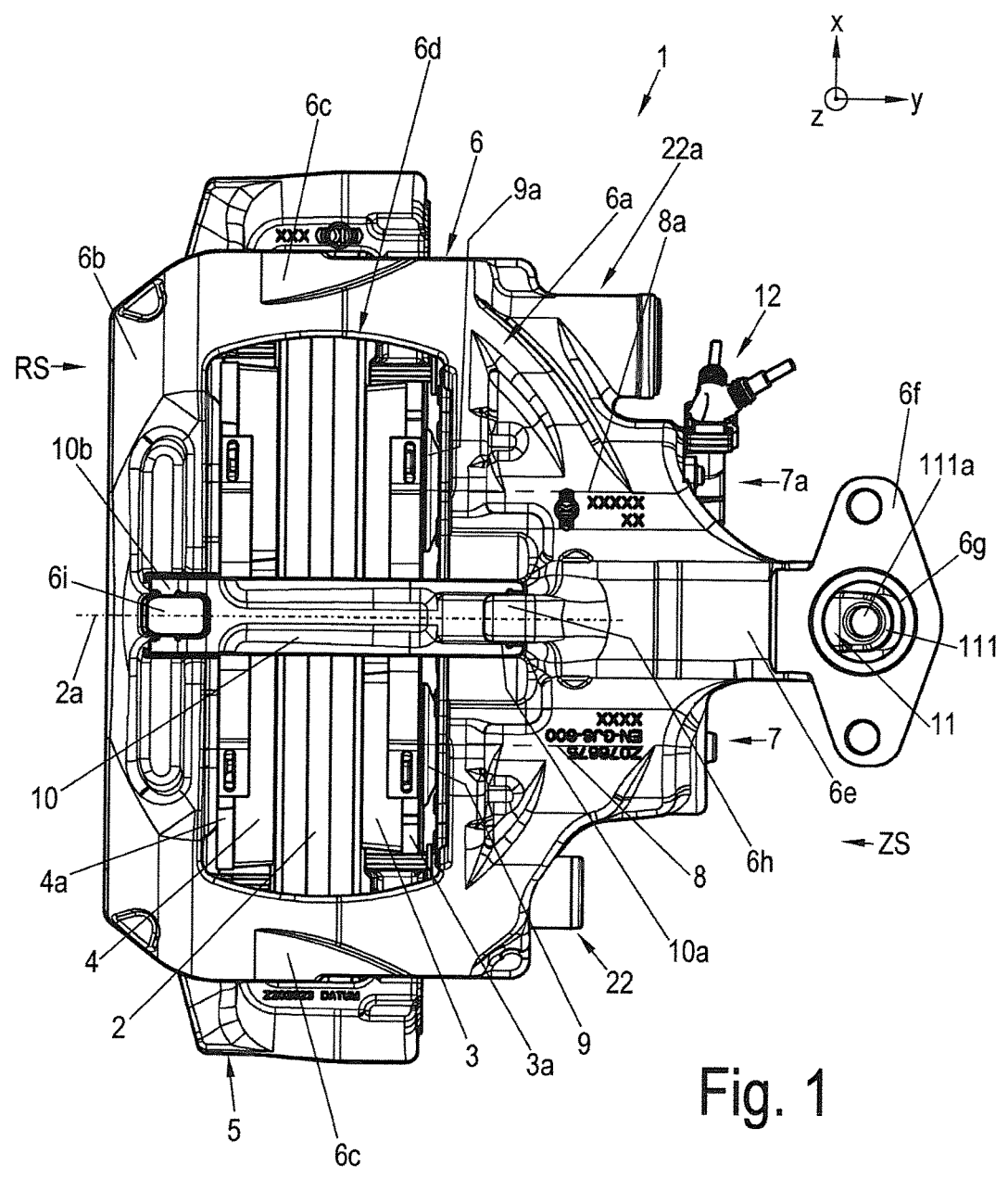
Figure 2:
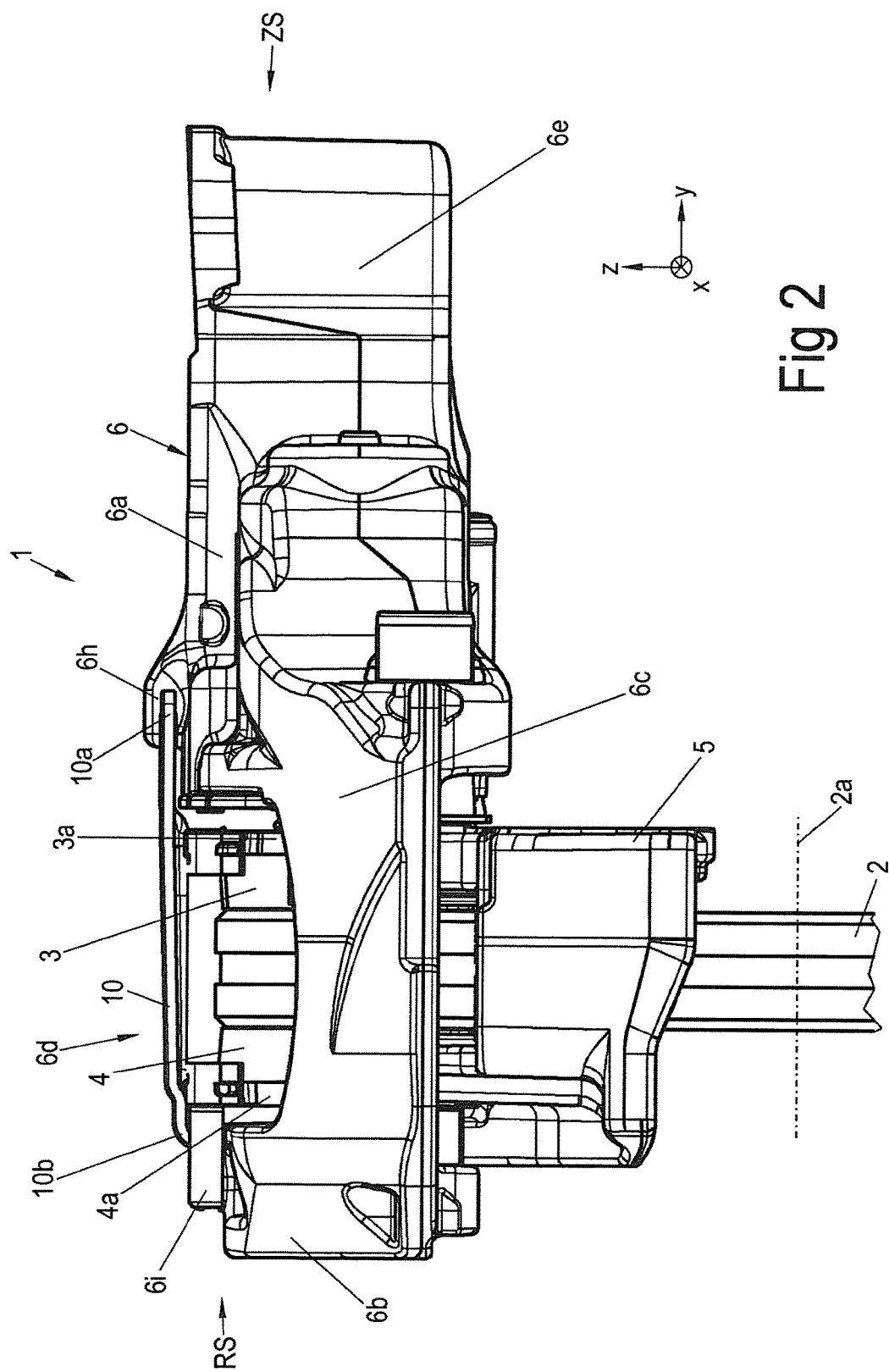
FIG. 2 is a schematic side view of the disc brake according to the invention in FIG. 1.
Figure 3:
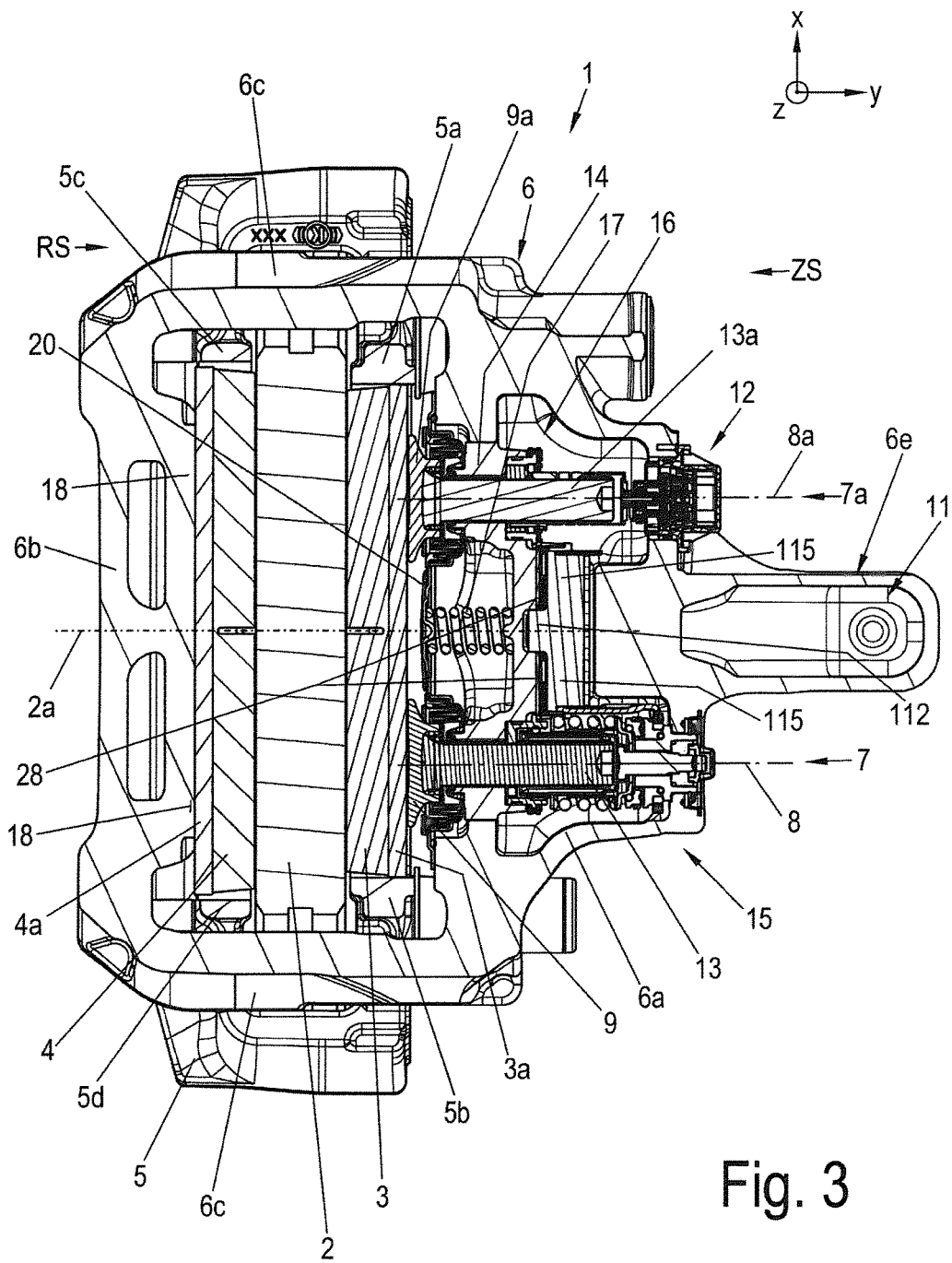
FIG. 3 is a schematic cross-sectional view of the disc brake according to the invention in FIG. 1.

FIG. 1 shows a schematic top view of an exemplary embodiment of a disc brake 1 according to the invention. FIG. 2 shows a schematic side view of the disc brake 1 according to the invention in FIG. 1. FIG. 3 shows a schematic cross-sectional view of the disc brake 1 according to the invention in FIG. 1, in an xy plane.

The disc brake 1 includes a brake disc 2 with a brake disc axis 2a. The brake disc 2 lies in an xz plane. The brake disc axis 2a runs in the y direction. On an application side of the brake disc 2 there is arranged an application-side brake pad 3 with a brake pad carrier 3a. Another, back-side brake pad 4 with a brake pad carrier 4a is arranged on a back side of the brake disc 2. The brake pads 3 and 4 are each received in a receiving shaft of a brake carrier 5 (FIG. 3). The brake carrier 5 is fixed in a stationary manner on a corresponding vehicle, not shown more closely. The application-side brake pad 3 is held and guided in the x direction in its receiving shaft on either side of the receiving shaft by so-called brake carrier horns 5a, 5b, which extend in the z direction. In similar fashion, the back-side brake pad 4 is arranged between brake carrier horns 5c, 5d. In this embodiment, the application-side brake pad 3 is shorter in the x direction than the back-side brake pad 4. This can be clearly recognized in FIG. 3.

The disc brake 1 is a so-called radial brake, i.e., a disc brake wherein an introduction of the application force to a brake application mechanism occurs on the application face ZS in the radial direction in regard to the brake disc 2, which runs here in the z direction.

The brake disc 2 is covered in the manner of a frame in an edge region by a brake caliper 6, designed here as a floating (sliding) caliper. The brake caliper 6 has a brake application portion 6a, a caliper back 6b, two tie bars 6c and a lever housing 6e with a flange 6f.

The brake application portion 6a is located on the application face ZS and includes the brake application mechanism of the disc brake 1. The brake application mechanism will be explained further below. The caliper back 6b is arranged on the back face RS, an imaginary longitudinal axis of the caliper back 6b running in the x direction. The two tie bars 6c are arranged above the brake disc 2, their imaginary longitudinal axes running parallel with each other and parallel with the brake disc axis 2a in the y direction. The two tie bars 6c are each firmly joined together at the side by one end of the brake application portion 6a and by one end of the caliper back 6b and form a single piece with them, e.g., as a casting. The brake application portion 6a, the caliper back 6b and the two tie bars 6c in this case form between them an installation opening 6d, through which the brake pads 3, 4 can be installed and removed left and right alongside the brake disc 2 in their receiving shafts in the brake carrier 5 in the z direction.

The brake caliper 6 is mounted so as to be able to move in the y direction on the brake carrier 5 by way of axial bearings 22, 22a, not further shown, and will be further described below in connection with FIGS. 6 and 7.

The brake pads 3, 4 are held in their receiving shafts in the brake carrier 5 by a brake pad support bracket 10. The brake pad support bracket 10 extends across the brake disc 2 in the direction of the brake disc axis 2a in the y direction and spans the installation opening 6d of the brake caliper 6. The brake pad support bracket 10 is held with an application-side end portion 10a in a bracket bearing 6h on the top side of the brake application portion 6a of the brake caliper 6. A back-side end portion 10b of the brake pad support bracket 10 is secured in a further bracket bearing 6i on the top side of the caliper back 6b of the brake caliper 6. The bottom side of the lining support bracket 10 in this case makes contact with pad support springs of the brake pads 3, 4, not further indicated.

The disc brake 1 here is designed as a dual piston brake with two spindle units 7, 7a, each with a threaded rod 13, 13a. The threaded rods 13, 13a can also be called threaded tubes, threaded pistons, threaded spindles or pressing spindles. Axes of rotation of the spindle units 14, 14' are denoted here as spindle axes 8, 8a.

The application-side brake pad 3 is connected to its brake pad carrier 4a by the threaded rods 13, 13a of the spindle units 7, 7a, each time across a pressure piece 9, 9a. The pressure pieces 9, 9a are fixed each at one end of the threaded rods 13, 13a.

The back-side brake pad 4 is also called the reaction-side brake pad 4 and it is secured to its brake pad carrier 4a on the other side of the brake disc 2, i.e., on the back face RS, in the brake caliper 6. The side of the brake pad carrier 4a facing the back face RS in this case makes contact with the caliper back 6b across a pressing portion 18 of the caliper back 6b facing the brake disc 2. The pressing portion 18 extends parallel to the brake disc 2 and at right angles to the brake disc axis 2a in the x direction.

The threaded rods 13, 13a each have an external thread and are disposed so as to each be able to turn in corresponding internal threads in a bridge 14. The bridge 14 is also known as the crossbar. It is disposed in the brake application portion 6a of the brake caliper 6, extends in the x direction, and is part of the brake application mechanism.

Figure 4:
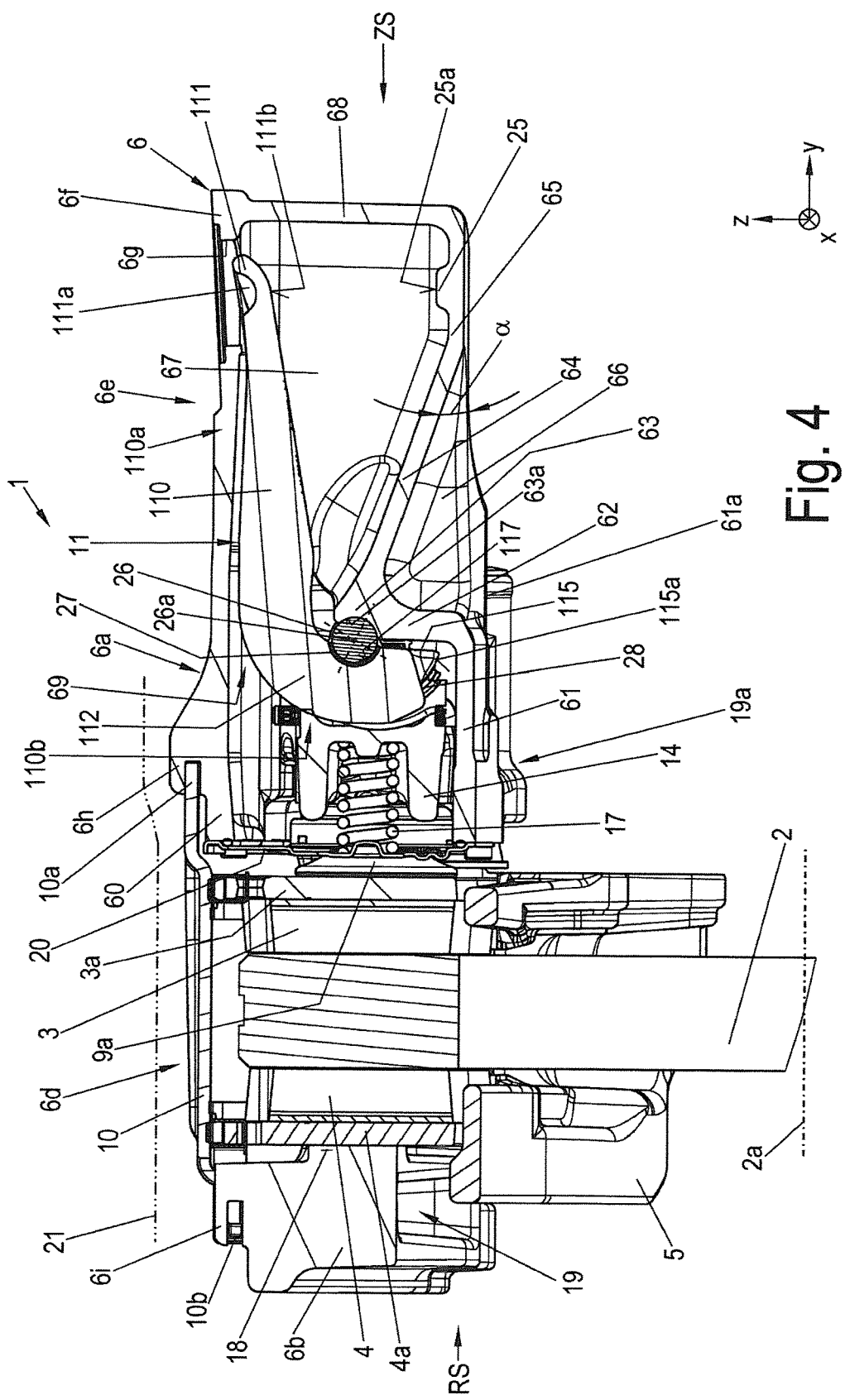
FIG. 4-5 are schematic cross-sectional views of the disc brake according to the invention in FIG. 2.

The bridge 14 and thus the threaded rods 13, 13a can be activated by a brake rotary lever 11 with a brake rotary lever axis 26a (see FIG. 4, 5), which runs at right angles to the brake disc axis 2a. The brake rotary lever 11 will be described more fully below and stands in cooperation with the bridge 14 across thrust bearing portions 115 (also see FIG. 4, 5; 8-11) and bearing segments 28 (FIG. 4, 5). A middle web 112 (also see FIG. 4, 5; 8-11) of the brake rotary lever 11 is led in a guide in the bridge 14, not further indicated, and forms a lever guidance in positive and negative x direction in the bridge 14, by way of which relative movements are reduced. The brake rotary lever 11 is arranged in a yz plane inside the brake application portion 6a and inside the lever housing 6e of the brake caliper 6 (FIG. 4, 5). This will be further explained below. A driving end 111 of the brake rotary lever 11 arranged in the end region of the lever housing 6e underneath the flange 6f of the brake caliper 6 is provided with a driving portion 111a, pointing upward toward the flange 6f. The flange 6f is provided with an opening 6g and serves to secure a compressed air cylinder, not shown (or some other force generating element), which extends in the z direction and stands in operative connection by way of a piston rod (not shown) with the driving portion 111a of the driving end 111 of the brake rotary lever 11. In this way, force is introduced into the driving end 111 of the brake rotary lever 11. This will be further explained below.

The bridge 14 can be moved in the y direction in the direction of the brake disc axis 2a by the brake rotary lever 11. A movement toward the brake disc 2 is called a brake application movement, and a movement in the other direction is called a release movement. A restoring spring 17 is received in the middle of the bridge 14 in a corresponding recess on the lining side of the bridge 14 and is braced against a bottom plate 20. The bottom plate 20 is also called the cover plate and it closes off the brake application portion 6a toward the brake disc 2, the ends of the threaded rods 13, 13a facing the brake disc 2 with portions of the corresponding pressure pieces 9, 9a extending through openings of the bottom plate 20, not further indicated, with a corresponding gasket seal. By means of the restoring spring 17, the bridge 14 is moved back during the release movement to the released position of the disc brake 1 as shown in FIGS. 1 and 4.

The disc brake 1 can have various power drives. The brake rotary lever 11 here is pneumatically activated by, e.g., a compressed air cylinder. For the design and operation of a pneumatic disc brake 1, reference is made to the corresponding specification of DE 197 29 024 C1.

A spacing between the brake pads 3, 4 and the brake disc 2 in the released position is known as play. Due to wear on the linings and the disc, this play grows larger. If this is not compensated, the disc brake 1 cannot achieve its peak performance, because an actuation stroke of the brake application mechanism, i.e., here the actuation stroke or a swivel angle of the brake rotary lever 11 about the brake rotary lever axis 26a (FIG. 4, 5), is no longer sufficient.

In this embodiment, an adjustment device 15 is arranged coaxially with the center axis on the threaded rod 13 on the lower spindle unit 7 shown in FIG. 1. By the term "adjustment" is meant a decreasing of the play. The previously established play is determined by the geometry of the disc brake 1 and has a so-called structural play. In other words, the adjustment device 15 decreases a play which is present, if this is too large in relation to the previously established play, to the nominal value of the previously established play. An extensive description of such an adjustment device 15 can be found in the document DE 10 2004 037 771 A1.

The upper spindle unit 7a shown in FIG. 1 is provided with a sensor 12, which is arranged coaxially with the upper spindle unit 7a, its threaded rod 13a and the spindle axis 8a. The sensor 12 serves to detect a wear on brake pads 3, 4 and brake disc 2 and will not be further described here.

The spindle axes 8, 8a and the brake disc axis 2a are arranged parallel to each other.

The adjustment device 15 cooperates with the brake rotary lever 11 by way of a drive unit not further indicated.

The threaded rods 13 and 13a are coupled to a synchronization unit 16, not further described, so that a turning motion of the threaded rod 13 about the spindle axis 8 produces a turning motion of the other threaded rod 13a about its spindle axis 8a and vice versa.

The adjustment device 15 in the case of an adjustment on account of wear on brake pads 3, 4 and brake disc 2 turns the lower threaded rod 13, whereby this turning motion of the threaded rod 13 is transmitted by the synchronization unit 16 to the other threaded rod 13a. The synchronization unit 16 ensures a synchronous movement of the threaded rods 13 and 13a of the spindle units 7 and 7a during adjustment processes (and possibly also resetting processes, depending on the type of adjustment device 15, which can also be outfitted to increase a play) and adjustments during servicing jobs, e.g., brake pad replacement (manual driving, e.g., by one actuation end of a threaded rod 13, 13a and/or a driving portion of the adjustment device 15).

When actuated during a brake application process of the disc brake 1, the required application force is generated via the brake rotary lever 11 mounted off center (eccentrically) from the spindle units 7, 7a and transmitted from the brake rotary lever to the bridge 14. The application force so transmitted to the bridge 14 is then transmitted by the two spindle units 7, 7a, their threaded rods 13, 13a with the pressure pieces 9, 9a to the brake pad carrier 3a of the application-side brake pad 3 and via the brake caliper 6, i.e., via the tension bars 6c, to the caliper back 6b and from the latter via the pressing portion 18 also to the brake pad carrier 4a of the back-side brake pad 4 and then to the brake disc 2. In this process, the spindle units 7, 7a are moved toward the brake disc 2. As soon as the application-side brake pad 3 makes contact with the brake disc 2, the brake caliper 6 with the back-side brake pad 4 is also moved by the resulting counterforce toward the brake disc 2, in the opposite direction of the application-side brake pad 3. As soon as the back-side brake pad 4 also touches the brake disc 2, a braking action is generated.

Figure 5:
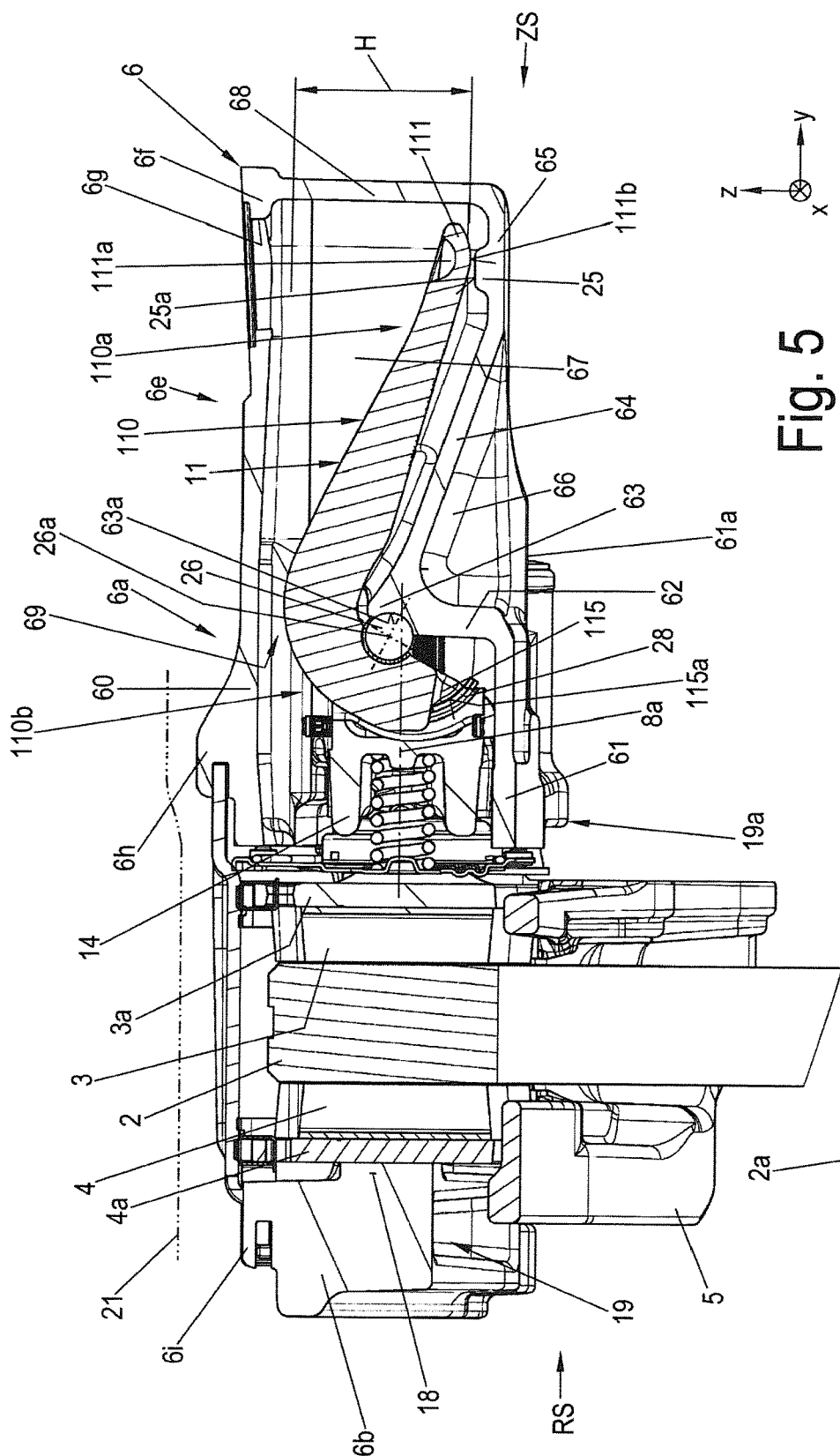

FIGS. 4 and 5 represent schematic cross-sectional views of the disc brake according to the invention in FIG. 2. FIG. 4 in this case shows the released position of the disc brake 1, while the applied position is represented in FIG. 5.

Both FIGS. 4 and 5 show a cross section in a yz plane standing perpendicular to the brake disc axis 2a. It is clearly recognizable here that the caliper back 6b of the brake caliper 6 together with the pressing portion 18 are constructed as a compact piece.

The brake application portion 6a has two regions. A first region faces the brake disc 2 and accommodates the brake application mechanism with the bridge 14 and the restoring spring 17, the threaded rods 13, 13a of the adjustment device 15 screwed into the bridge 14 (see FIG. 3), and a force transmission portion 110b of the brake rotary lever 11. A second region is the lever housing 6e, which adjoins the first region in the positive y direction. Between these two regions is arranged a support wall 62, arranged parallel to the brake disc 2, with a bearing portion 63 of a pivot bearing for the brake rotary lever 11. Above the bearing portion 63 of the support wall 62 is formed a passageway 69 between the latter and a top wall 60, which joins the two regions.

The brake application portion 6a includes the common top wall 60 together with the lever housing 6e. The top wall 60 extends from the brake disc 2 in the y direction in slightly curved form, first rising slightly from left to right in the z direction, then falling once more in the negative z direction to the flange 6f. The flange 6f is machined flat on its top side in an xy plane and has the opening 6g in the z direction.

The first region of the brake application portion 6a facing the brake disc 2 is surrounded from above by the top wall 60 and from below by a bottom wall 61. At the side, this region is enclosed on both sides by a side wall 67a (see FIG. 6, 7) in each case and bounded off from the lever housing 6e by the support wall 62.

The bottom wall 61 extends in an xy plane substantially parallel with an imaginary xy plane of the slightly curved top wall 60. The support wall 62 is molded onto the right end of the bottom wall 61 and extends perpendicular to the bottom wall 61 in an xz plane upward in the z direction. The upper end region of the support wall 62 is provided with a thickening in cross section, having a bearing portion 63 with a bearing seat 63a extending in the x direction perpendicular to the plane of the drawing. A cross section of the bearing seat 63a is in the shape of a circle segment and accommodates with a certain wrap-around angle a cylindrical pin 26 with circular cross section. The center axis of the bearing seat 63*a* and a center axis of the cylindrical pin 26 are identical and together form the brake rotary lever axis 26*a*.

As illustrated in FIG. 5, the brake rotary lever axis 26*a* here is disposed above the spindle axes 8, 8*a* in the z direction, i.e., off center (eccentrically) with respect to them.

The brake rotary lever 11 is provided, on the side of its force transmission portion 110*b*, facing away from the brake disc 2, with a bearing seat 117, in which the cylindrical pin 26 is accommodated in a bearing shell 27. The brake rotary lever 11 will be described in further detail below.

Between the top side of the bearing portion 63 of the support wall 62 and the inner side of the top wall 60 there is formed a free space as a passageway 69, having a length running in the z direction which roughly corresponds to the length of the support wall 62 in the z direction.

On the bearing portion 63 of the support wall 62 there is formed another slanted support wall 64, which extends to the right in the y direction through the lever housing 6*e*, sloping downward in the z direction, and passing at its end into another bottom wall 65. This slanted support wall 64 forms an angle α with the bottom wall 65, arranged in an xy plane, whose value is not equal to 0°. This geometry has been chosen in order to introduce the brake application forces to the brake caliper 6, the force being diverted from the bearing portion 63 at the most shallow possible angle α into the lever housing 6*e* and thus into the brake caliper 6. It has been found that an angle α of preferably 30° enables a very effective force introduction.

The bottom wall 65 and the bottom wall 61 can run in the same plane or in different planes lying parallel to each other. Furthermore, the bottom wall 65 here is arranged substantially parallel to the imaginary xy plane of the top wall 60, especially to the top side of the flange 6*f*.

The support wall 62 and the slanted support wall 64 form a wedge shape inside the lever housing, also known as the outer pocket. This provides for a weight and casting optimization of the brake caliper 6. The slanted support wall 64 in this case is joined on both sides to side support walls 66 (also see FIG. 7), so that the lever housing 6*e* is closed in this region. Thus, the lever housing 6*e* is enclosed by a portion of the top wall 60 with the flange 6*f* from above, by the slanted support wall 64 with its side support walls 66 and the bottom wall 65, as well as portions of the bottom wall 61*a* (see also FIG. 7) from below, by the support wall 62 at the left toward the brake application portion 6*a*, on both sides by the side walls 67 and on the right side in FIG. 4, 5 by a rear wall 68. In this way, a cross section of the lever housing 6*e* tapers in the longitudinal direction in the negative y direction starting at the junction of the slanted support wall 64 with the bottom wall 65 as far as the support wall 62 or the passageway 69.

The rear wall 68 extends in an xz plane and is connected to the top wall 60, i.e., to the flange 6*f*, to the bottom wall 65, and the side walls 67.

The support wall 62 and the rear wall 68 are arranged parallel to each other and also to the bottom (cover) plate 20. Since they are arranged in xz planes, they are also parallel to the brake disc 2.

The brake rotary lever 11 has a shape as slender as possible and curved in its longitudinal direction (y direction) (FIG. 8-11) with a lever body 110, which extends through the passageway 69 into the lever housing 6*e* by way of a lever portion 110*a* of the body 110 with the driving end 111. A transition from the lever portion 110*a* to the force transmission portion 110*b* lies in the region of the passageway 69.

The middle web 112 of the lever body 110 of the brake rotary lever 11 (also see FIG. 8-11) is provided with thrust bearing portions 115 on either side in the region of the force transmission portion 110*b*. These shall be further explained below in connection with FIG. 8-11. The thrust bearing portions 115 have thrust bearing surfaces 115*a*, facing the brake disc 2 and cooperates with the bridge 14 across bearing segments 28, such as needle bearing segments.

The driving portion 111*a* of the driving end 111 of the brake rotary lever 11 in the released position of the disc brake 1 shown in FIG. 4 is arranged beneath the opening 6*g* of the brake caliper 6. The lever body 110 of the brake rotary lever 11 in this position is arranged within the lever housing 6*e* of the brake caliper 6 such that the top side of the lever body 110 runs substantially parallel to the inner side of the portion of the top wall 60 of the lever housing 6*e*, so that the driving end 111 projects from the inside of the brake caliper 6 for a certain portion into the opening 6*g*.

On the underside of the driving end 111 of the brake rotary lever 11 there is provided an end stop surface 111*b*, which is made for example by a chip-removing machining process, such as milling or grinding. The end stop surface 111*b* in the applied position of the disc brake 1 shown in FIG. 5 interacts with a stationary end stop surface 25*a* of an end stop portion 25 of the brake caliper 6. The end stop portion 25 projects inward on the inner side of the bottom wall 65 of the brake caliper 6. The end stop surface 25*a* of this end stop portion 25 is likewise machined, e.g., by milling or grinding.

In the applied position (FIG. 5), the brake rotary lever 11 is swiveled clockwise about the brake rotary lever axis 26*a* by the action of the piston rod of the compressed air cylinder (not shown, but readily understood). Due to the eccentricity of the force transmission portion 110*b* with respect to the spindle axes 8, 8*a*, which lie in an xy plane running centrally through the plane of a longitudinal axis of the bridge 14, the brake application force applied to the driving end 111 of the brake rotary lever 11 acts on the bridge 14, amplified by a leverage ratio of the brake rotary lever 11 through the thrust bearing portions 115 and the bearing segments 28, so that the bridge is displaced toward the brake disc 2 in the negative y direction and a braking action occurs. The leverage ratio of the brake rotary lever 11 is formed by a length of the lever portion 110*a* of the lever body 110 and by a length of the force transmission portion 110*b*, each of them in relation to the brake rotary lever axis 26*a*.

Upon applying the brake, the driving end 111 of the brake rotary lever 11 travels about the brake rotary lever axis 26*a* for a segment of a circular path. A chord of this segment of a circular path is indicated here as the stroke H of the brake rotary lever 11.

FIG. 5 clearly shows that, in this example in the applied position of the brake, the top side of the lever body 110 now runs substantially parallel with the inner side of the slanted support wall 64 of the lever housing 6*e*, while the end stop surface 111*b* of the driving end 111 stands just in front of the end stop surface 25*a* of the end stop portion 25. The end stop surfaces 111*b* and 25*a* limit the stroke H of the brake rotary lever 11.

Due to the machining of the respective end stop surface 111*b* and 25*a*, it is possible to realize different stroke lengths of the stroke H of the brake rotary lever 11 for different disc brakes 1. In other words, from a single blank of the brake caliper 6 it is possible to fabricate at least two brake variants. Furthermore, the flange surface on the top side of the flange 6*f* can be machined separately for this purpose.

The disc brake 1 in the embodiment of a radial brake as illustrated requires a brake rotary lever 11 which is longer than the installation shaft or the installation opening 6*d*. Hence, the brake rotary lever 11 must be swiveled through the opening of the brake application portion 6*a*, which is closed afterwards by the bottom plate 20, into the brake application portion 6*a* with the lever housing 6*e*. This swiveling process is facilitated in that the brake rotary lever 11 has the most slender possible curved shape. This is principally achieved in that the mounting of the brake rotary lever 11 with the cylindrical pin 26 in the bearing portion 63 of the brake caliper 6 has a smaller radius than the counterbearing by the thrust bearing portion 115 and the bearing segment 25 on the bridge 14. The brake rotary lever 11 will be described in further detail below in connection with FIG. 8-11.

In this exemplary embodiment, the caliper back 6*b* of the brake caliper 6 has, at its bottom side in the region of the axle (not shown) of a corresponding vehicle, a significantly larger clearance 19 than a clearance 19*a* on the bottom side of the brake application portion 6*a* in the region of the outer side of the bottom wall 61. The clearance 19*a* can in this case form a control machining for a maximum clearance of the axle. By clearance is meant here a distance from the axle or the brake disc axis 2*a* to the respective bottom side of the brake caliper 6.

It is furthermore provided that the bracket bearings 6*h*, 6*i* of the brake pad support bracket 10 are arranged on the top side of the brake caliper 6 such that an envelope curve 21 of a rim of the corresponding vehicle is taken into account. This envelope curve 21 is indicated here by a double dot and dash line, and the envelope curve 21 is meant to define an internal diameter of the rim. The back-side end portion 10*b* of the brake pad support bracket 10 is secured in the other bracket bearing 6*i* on the caliper back 6*b*, the other bracket bearing 6*i* being arranged far beneath the envelope curve 21. The envelope curve 21 of the rim runs from the caliper back 6*b* to the start of the brake application portion 6*a* further in the y direction in parallel with the brake disc axis 2*a*, then slants upward abruptly for a short distance, and again runs parallel to the brake disc axis 2*a*. Adapted to the position of this jump in the envelope curve 21, the bracket bearing 6*h* for the application-side end portion 10*a* of the brake pad support bracket 10 is arranged further to the right on the top side of the brake application portion 6*a* of the brake caliper 6, i.e., at a distance from the start of the brake application portion 6*a* or from the start of the top wall 60. In this way, an easy adaptation to the envelope curve 21 is accomplished, not requiring any changes to the rims.

The bracket bearings 6*h*, 6*i* can have slots to accommodate the respective bracket end 10*a*, 10*b* of the brake pad support bracket 10, which slots can be made by simple machining, such as milling.

Figure 6:
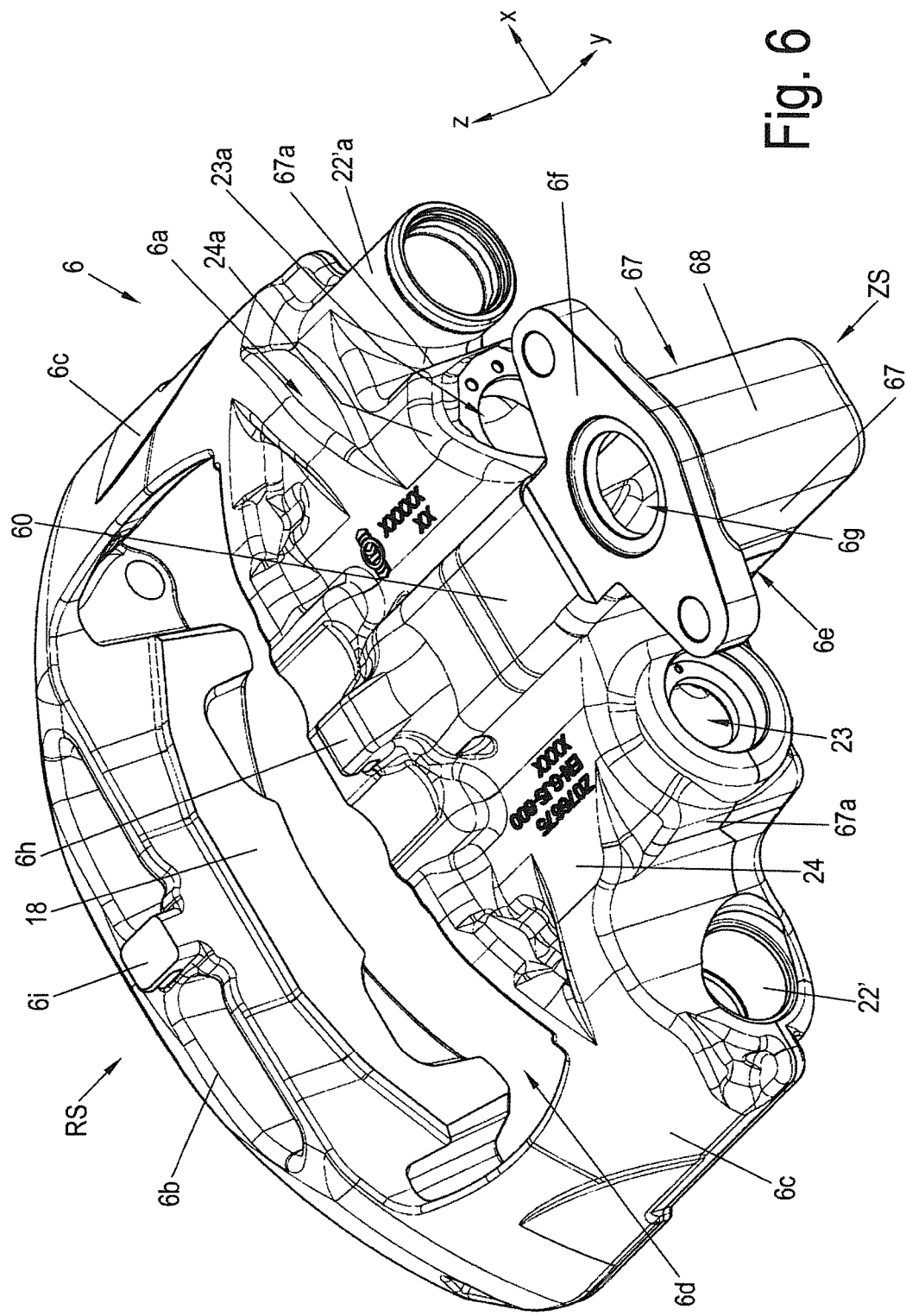
FIG. 6-7 are schematic perspective views of a brake caliper according to the invention of the disc brake according to the invention in FIGS. 1 and 2.
Figure 7:
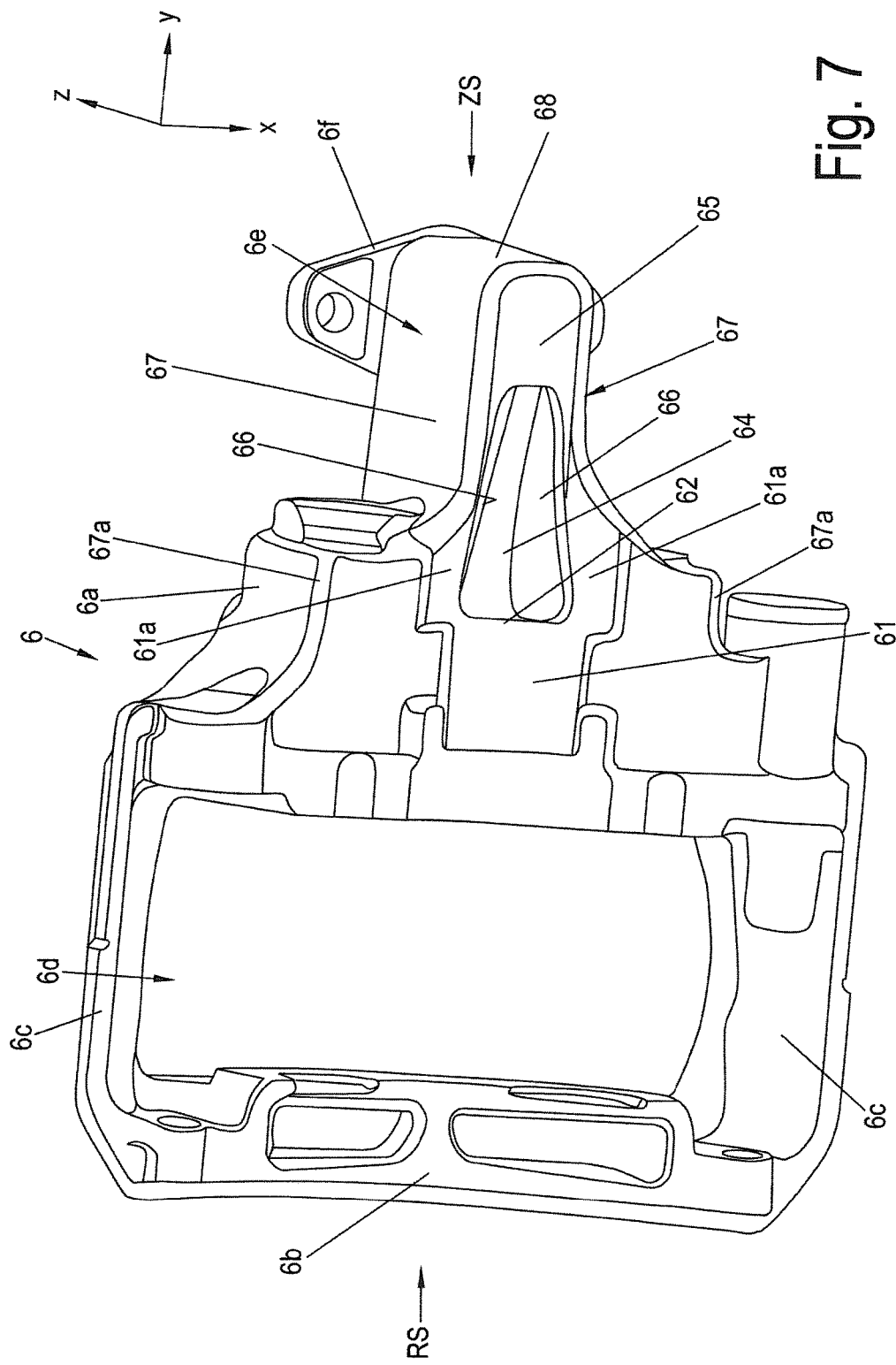

FIGS. 6 and 7 represent schematic perspective views of the brake caliper 6 according to the invention of the disc brake 1 according to the invention in FIGS. 1 and 2. FIG. 6 shows a view of the application face ZS from above, while FIG. 7 shows a view of the underside of the brake caliper 6.

The respective x, y, z coordinates refer to those in the previous figures.

In FIG. 6 it can be seen that the top side of the brake application portion 6*a* of the brake caliper 6 as seen from above forms a kind of triangle. The base side of this imaginary triangle in this case is a line in the x direction with the corner points at the connection points of the tie bars 6*d* with the brake application portion 6*a*. From each of these corner points runs an imaginary line in the direction of the lever housing 6*e*, in which these imaginary lines intersect at a common point above the brake disc axis 2*a*.

Looking from the application face ZS, the brake application portion 6*a* has an axial bearing seat 22', 22'*a* on either side in the region of the connections to the tie bars 6*c* in order to receive the axial bearings 22, 22*a* (FIG. 1). Between the left axial bearing seat 22' and the lever housing 6*e* is arranged a spindle unit seat 23 for the spindle unit 7 (FIG. 1, 3). On the other side of the lever housing 6*e* is situated another spindle unit seat 23*a* for the other spindle unit 7*a* (FIG. 1, 3) between the lever housing 6*e* and the other, right axial bearing seat 22'*a*.

From the corner points of the base side of the imaginary triangle extend top surfaces 24, 24*a* on both sides of the lever housing 6*e*, which are connected to the top wall 60 on the brake application portion 6*a* and on the lever housing 6*e*. The top surfaces 24, 24*a* also form protection and covering functions in regard to fouling of the structural parts situated underneath.

FIG. 7 illustrates by way of the view of the bottom side of the brake caliper 6 the arrangement of the bottom walls 61, 61*a* and 65. Furthermore, the wedge-shaped indentation can be recognized, which is formed by the support wall 62, the bearing portion 63, the slanted support wall 64 and the side support walls 66.

Furthermore, in FIG. 6 the inside of the caliper back 6*b* with the pressing portion 18 is clearly shown, the pressing portion 18 being completely visible through the installation opening 6*d*.

The side walls 67 of the lever housing 6*e* run at first from the rear wall 68 in the negative y direction in parallel with each other and then substantially slanting in the direction of the corner points of the base side of the imaginary triangle. Here, they pass into side walls 67*a*, which follow or pass into the contours of the various seats 22', 22'*a* and 23, 23*a*.

The brake caliper 6 is made as a one-piece part, e.g., from a metal casting. In one embodiment, in this case only a single core or two mirror-image cores are required.

FIG. 8-11 are schematic views of a brake rotary lever 11 according to the invention of the disc brake 1 according to the invention in FIGS. 1 and 2.

Figure 8:
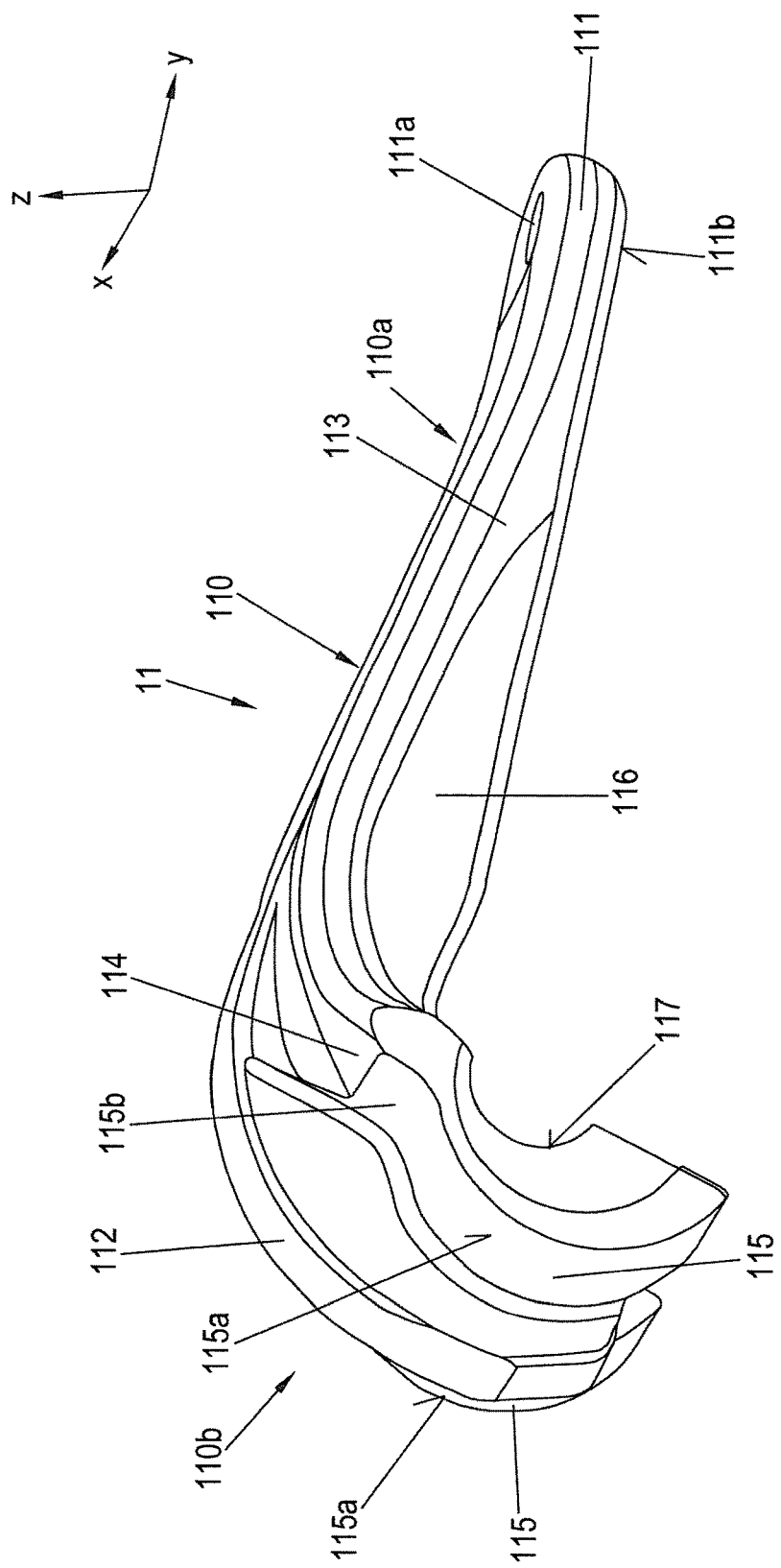
FIG. 8-11 are schematic views of an exemplary brake rotary lever according to the invention of the disc brake according to the invention in FIGS. 1 and 2.
Figure 9:
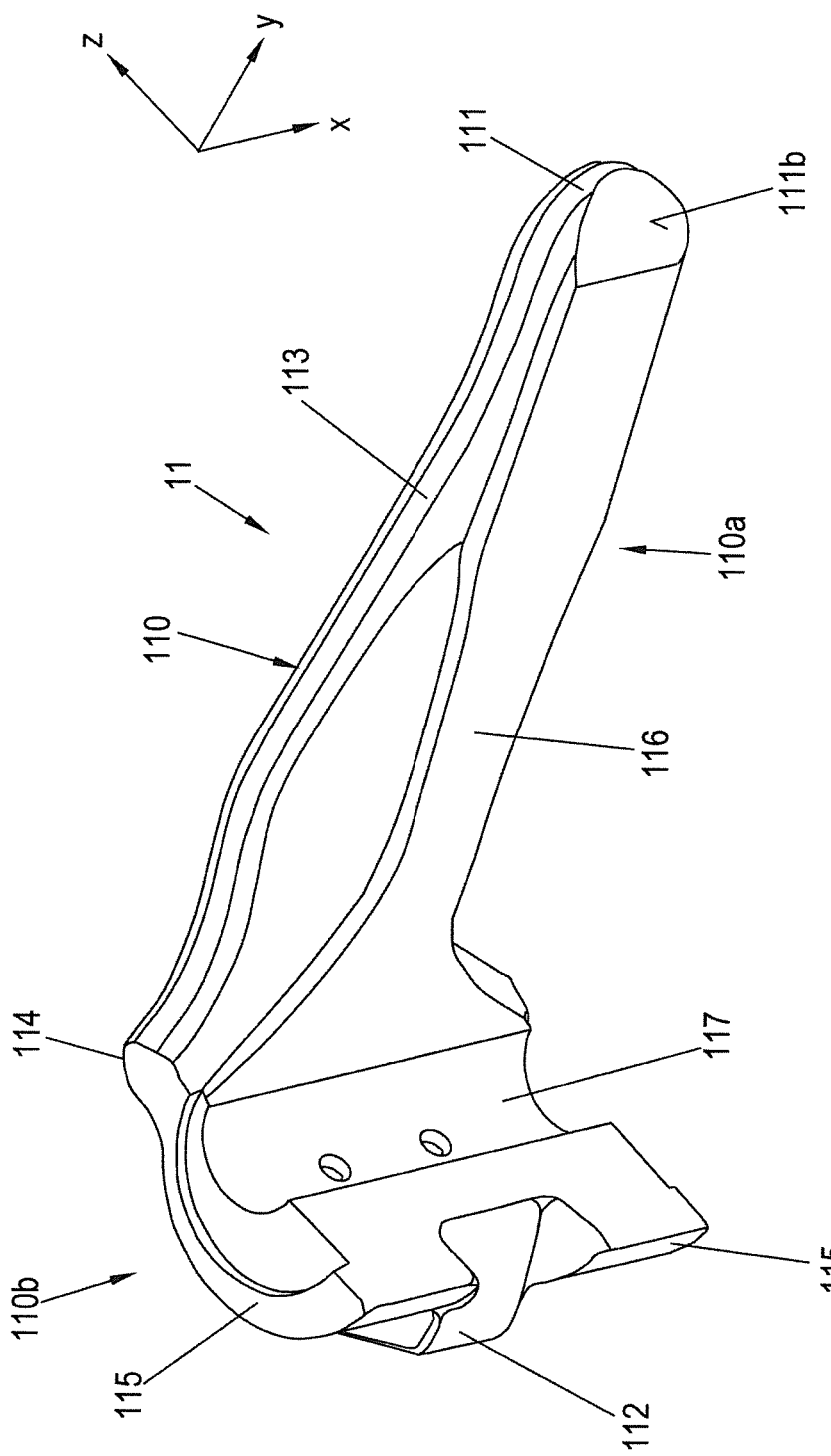
Figure 10:
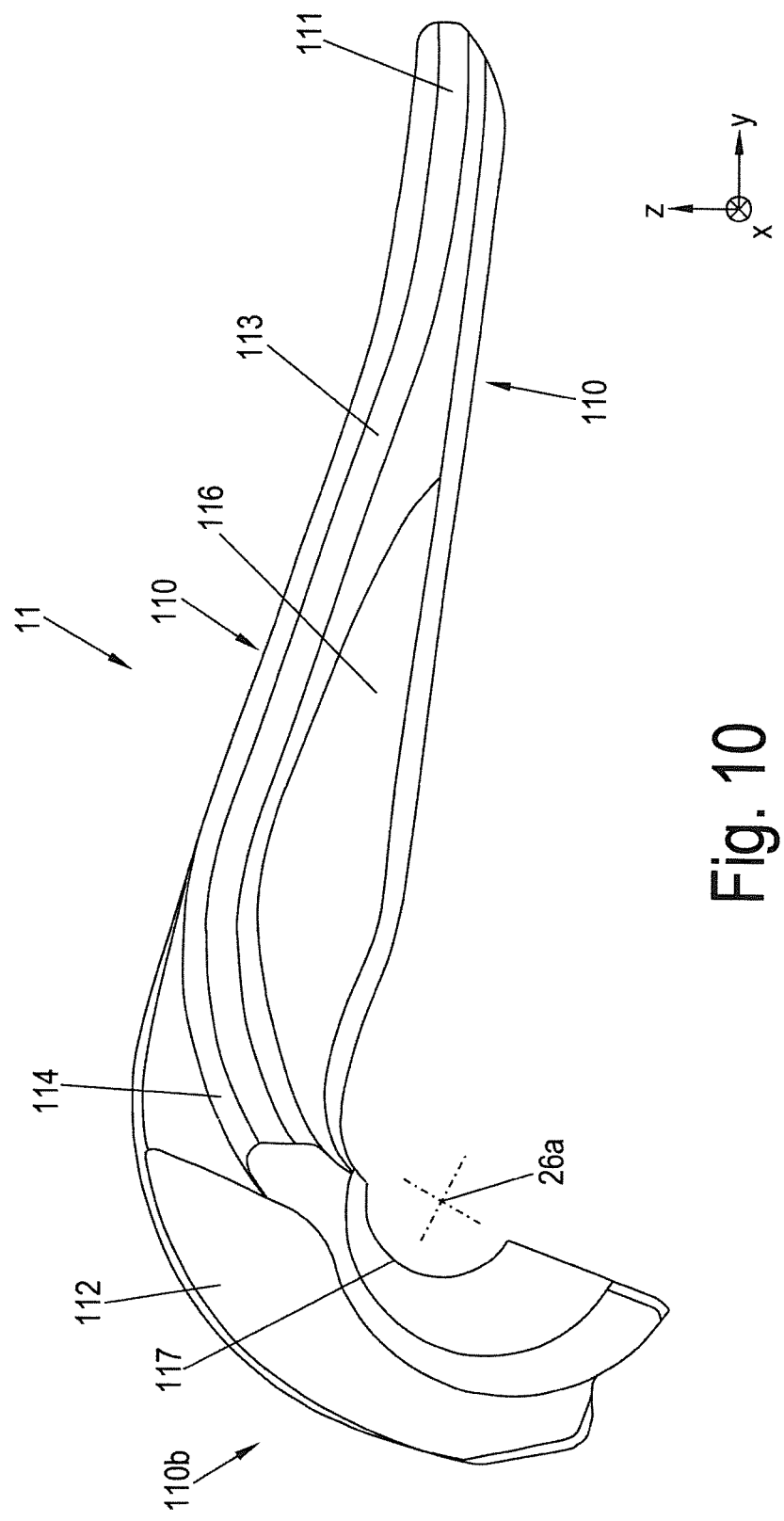
Figure 11:
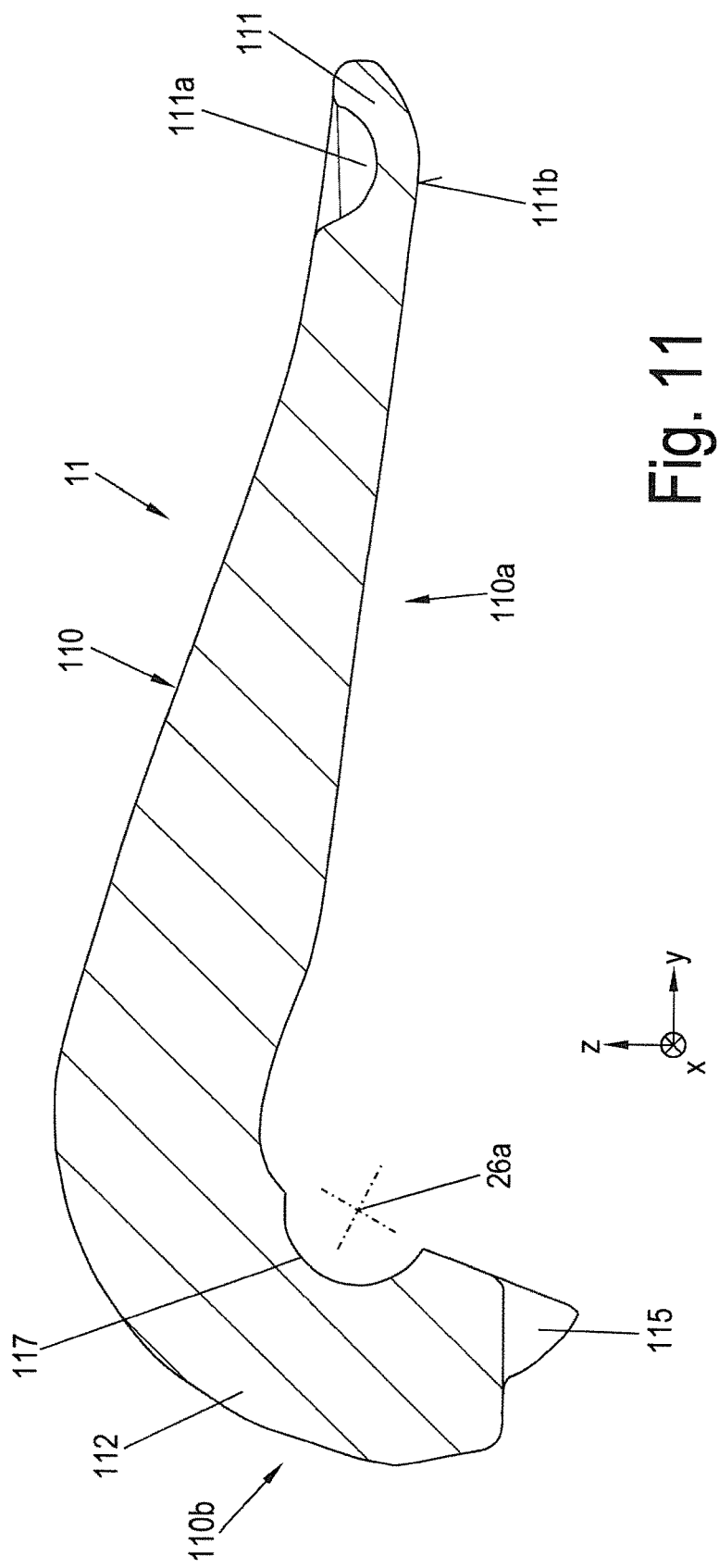

FIG. 8 shows a perspective view from the side and FIG. 9 a perspective view from the bottom of the brake rotary lever. FIG. 10 shows a side view and FIG. 11 a cross-sectional view in a vertical plane through the longitudinal axis of the brake rotary lever 11.

The respective x, y, z coordinates in FIG. 8-11 also refer to those in the previous figures.

The brake rotary lever 11 includes a lever body 110 with side portions 113 and with a longitudinal stiffening 116, and thrust bearing portions 115.

The lever body 110 has a lever portion 110*a* and a force transmission portion 110*b*, which are connected on the underside to the length stiffening 116. The lever portion 110*a* starts here at the right end of the lever body 110, called the driving end 111, and is slightly curved upward, i.e., in the z direction. On the top side of the driving end 111 is formed the driving portion 111*a*, which is intended to interact with the piston rod of the compressed air cylinder or some other force generating element. On the underside beneath the driving portion 111*a* there is provided the end stop surface 111*b*, which can be machined or not.

The lever portion 110*a* of the lever body 110 then runs in the negative y direction, at first starting from the driving end 111, becoming flat on the top side in a straight portion as far as a thickening, where a middle web 112 occurs.

The lever portion 110*a* of the lever body 110 extends in its width, i.e. the x direction, by side portions 113 on either side at first for roughly a quarter of the overall length of the lever portion 110a in the negative y direction. Then the side portions 113 widen within roughly a quarter of the length of the lever portion 110a in the course of a bevel in each case in the positive and negative x direction and pass via a fillet into a definite width, which then increases further in size at the place where the middle web 12 occurs up to a transition 114 in each case in an arc in the positive and negative x direction.

On the underside of the lever portion 110a at the start of the longitudinal stiffening 116 is fixed the end stop surface 111b at such an angle that the end stop surface 111b in the applied position (FIG. 5) stands parallel with the end stop surface 25a of the end stop portion 25 of the brake caliper 25. Then the longitudinal stiffening 116 extends from the end stop surface 111b underneath the lever portion 110a in the same width as its top side and that of the side portions 113. After around a third in the negative y direction, the longitudinal stiffening 116 runs slightly downward at a slant, while its width on both sides becomes smaller in a slight arc. In the last quarter of the length of the lever portion 110a, the longitudinal stiffening 116a runs slightly upward, and its width on both sides increases in the manner of a triangle, until it becomes as wide as the transition 114 in the x direction.

At the height of the transitions 114, the projecting middle web 112 then runs downward roughly in a semicircle and counterclockwise in a definite radius about the brake rotary lever axis 26a.

On either side of the semicircular middle web 112 is arranged a thrust bearing portion 115 with a respective thrust bearing surface 115a. However, the projecting middle web 112 does not end in a line with the thrust bearing portions 115 at the end of the semicircle, but prior to that in a portion with a straight surface, which then runs in the y direction substantially at a right angle and emerges into a clearance between the thrust bearing portions 115.

In the body which is formed from the thrust bearing portions 115 there is formed a bearing seat 117 on the underside, connected to the longitudinal stiffening 116, which extends in the x direction and is substantially semi-circular in cross section. The bearing seat 117 lies on the side of the force transmission portion 110b facing the driving end 111 of the lever body 110 and accommodates the bearing shell 27 in which the cylindrical pin 26 is mounted (see FIG. 4, 5). The bearing seat 117 has a center line which is identical to the brake rotary lever axis 26a. However, the brake rotary lever axis 26a is not the midpoint of the radii of the semicircular thrust bearing portions 115, but instead lies off center thereto. Furthermore, the radius of the bearing seat 117 is significantly smaller than the diameter of the thrust bearing surfaces 115a.

The side portions 113 after the transition 114 pass into the respective thrust bearing surface 115a across a tool run-out 115b in each case. The tool run-out 115b is rounded here so that a midpoint of its fillet lies above the force transmission portion 110b.

The thrust bearing surfaces 115a are provided for an interaction with one bearing segment 28 each (FIG. 4, 5), as already described above.

The brake rotary lever 11 is made as a single piece. The thrust bearing surfaces 115a, the middle web 112 and the bearing seat 117 are generated by appropriate machining methods, such as milling and grinding.

The above-described sample embodiments do not limit the invention. It can be modified in the spirit of the invention.

For example, it is contemplated for the brake rotary lever 11 to be made from several pieces, such as at least two portions, in which case the at least two portions can be inseparably joined together, such as by welding.

Furthermore, it may be possible for the disc brake 1 to have only one spindle unit 7, 7a or more than two spindle units 7, 7a.

The disc brake 1 can have an electric power generation for actuation instead of a compressed air actuation.

LIST OF REFERENCE NUMBERS 1 disc brake
2 brake disc
2a brake disc axis
3, 4 brake pad
3a, 4a brake pad carrier
5 brake carrier
5a, 5b; 5c, 5d brake carrier horn
6 brake caliper
6a brake application portion
6b caliper back
6c tie bar
6d installation opening
6e lever housing
6f flange
6g opening
6h, 6i bracket bearing
7, 7a spindle unit
8, 8a spindle axes
9, 9a pressure piece
10 brake pad support bracket
10a, 10b end portion
11 brake rotary lever
12 sensor
13, 13a threaded rod
14 bridge
15 adjustment device
16 synchronization unit
17 restoring spring
18 pressing portion
19, 19a clearance
20 bottom plate
21 envelope curve
22, 22a axial bearing
22', 22'a axial bearing seat
23, 23a spindle unit seat
24, 24a top portion
25 end stop portion
25a end stop surface
26 cylindrical pin
26a brake rotary lever axis
27 bearing shell
28 bearing segment
60 top wall
61, 61a, 65 bottom wall
62, 64 support wall
63 bearing portion
63a bearing seat
66 side support wall
67, 67a side wall
68 rear wall
69 passageway
110 lever body
110a lever portion
110b force transmission portion
111 driving end 111a driving portion
111b end stop surface
112 middle web
113 side portion
114 transition
115 thrust bearing portion
115a thrust bearing surface
115b tool run-out
116 longitudinal stiffening
117 bearing seat
α angle
H stroke
RS back face
x, y, z coordinates
ZS application face The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for a motor vehicle, comprising:
   a brake application mechanism with a brake rotary lever and at least one spindle unit having a threaded rod screwed into a bridge;
   a brake caliper framing an edge region of a brake disc, wherein
   the brake caliper comprises a brake application portion and a caliper back, which are connected together by tie bars,
   the brake application mechanism with the brake rotary lever is received in the brake application portion of the brake caliper from an application face side of the brake disc,
   the brake application portion of the brake caliper is configured to have:
   a) a first region in which the brake application mechanism and a force transmission portion of the brake rotary lever are arranged,
   b) a second region formed as a lever housing that receives a lever portion of the brake rotary lever, and
   c) a support wall arranged between the first region and the second region, the support wall having a bearing portion that forms a pivot bearing with a brake rotary lever axis, that runs parallel to the brake disc, for the brake rotary lever,
   wherein the brake rotary lever has a curved shape in its longitudinal direction with a lever body having side portions, a longitudinal stiffening, and at least one thrust bearing portion,
   wherein the lever body of the brake rotary lever has a lever portion and a force transmission portion, which are connected at the bottom side of the lever body to the longitudinal stiffening,
   wherein the force transmission portion of the lever body has a roughly semicircular middle web, on either side of which is arranged a semicircular thrust bearing portion with a respective thrust bearing surface, the middle web protruding from the thrust bearing portions, and
   wherein the middle web protruding from the thrust bearing portions is received in a guide of the bridge, thus forming a form-fitted lever guidance of the brake rotary lever in the direction of the brake rotary lever axis.

2. The disc brake as claimed in claim 1, wherein two or more spindle units are provided, each spindle unit having a threaded rod screwed into the bridge.

3. The disc brake as claimed in claim 1, wherein the first region of the brake application portion has at least one bottom wall which runs substantially parallel with a portion of a top wall of the brake application portion.

4. The disc brake as claimed in claim 3, wherein the support wall is arranged parallel to the brake disc and so as to be connected to the at least one bottom wall.

5. The disc brake as claimed in claim 4, wherein a passageway between the first region and the second region of the brake application portion is provided between the bearing portion of the support wall and an inner side of the top wall.

6. The disc brake as claimed in claim 5, wherein the second region of the brake application portion has a bottom wall, which runs substantially parallel to a further portion of the top wall of the brake application portion.

7. The disc brake as claimed in claim 6, wherein the further portion of the top wall of the brake application portion has a flange, in the second region at an end region of the lever housing, with an opening for attachment of a power drive for the disc brake.

8. The disc brake as claimed in claim 7, wherein the bottom wall of the lever housing has, on an inner side, an end stop portion with an end stop surface projecting toward the interior of the lever housing, said end stop surface being arranged beneath the opening of the flange.

9. The disc brake as claimed in claim 4, wherein the second region of the brake application portion of the brake caliper has a rear wall, which is arranged parallel to the support wall.

10. The disc brake as claimed in claim 6, wherein the support wall is connected to a slanted support wall, the slanted support wall extends away from the brake disc at an inclination in the direction of a brake disc axis and is connected to the bottom wall of the second region.

11. The disc brake as claimed in claim 10, wherein the slanted support wall forms an angle with the bottom wall whose value is not equal to 0°.

12. The disc brake as claimed in claim 11, wherein the angle has a value in the range of 15° to 45°.

13. The disc brake as claimed in claim 11, wherein a cross section of the lever housing tapers in the longitudinal direction toward the brake disc starting at the connection of the slanted support wall to the bottom wall and as far as the support wall or the passageway.

14. The disc brake as claimed in claim 1, wherein the lever portion has a driving end, which at a top side has a driving portion for interaction with a piston rod of a force generating element, and the driving end has an end stop surface at a bottom side, which bottom side lies opposite the driving portion.

15. The disc brake as claimed in claim 1, wherein on the side opposite the thrust bearing surfaces of the thrust bearing portions there is formed a bearing seat with a roughly semicircular cross section, the bearing seat having a center line which is identical to the brake rotary lever axis.

16. The disc brake as claimed in claim 15, wherein the center line of the bearing seat is arranged off center from a midpoint of the radii of the semicircular thrust bearing surfaces of the thrust bearing portions.

17. The disc brake as claimed in claim 16, wherein a radius of the bearing seat is smaller than a radius of the thrust bearing surfaces of the thrust bearing portions.

18. The disc brake as claimed in claim 1, wherein the brake caliper is formed in one-piece.

19. The disc brake as claimed in claim 1, further comprising a wear adjustment device coupled with the brake application mechanism.

20. The disc brake as claimed in claim 1, wherein the disc brake is a radial brake.

* * * * *